United States Patent
Drabik et al.

(10) Patent No.: US 7,258,384 B2
(45) Date of Patent: Aug. 21, 2007

(54) FOLDING RAMP SYSTEM

(75) Inventors: Mark Drabik, Macomb Township, MI (US); Kenneth V. Hollewa, Macomb, MI (US); Brian Harrod, Leonard, MI (US); David Mitchenall, Shelby Township, MI (US); Jay H. Ovenshire, Macomb Township, MI (US)

(73) Assignee: GM GlobaL Technology Operations, Inc., Detroit, MI (US)

( * ) Notice: Subject to any disclaimer, the term of this patent is extended or adjusted under 35 U.S.C. 154(b) by 198 days.

(21) Appl. No.: 11/109,268

(22) Filed: Apr. 19, 2005

(65) Prior Publication Data

US 2006/0232089 A1    Oct. 19, 2006

(51) Int. Cl.
*B60P 1/44* (2006.01)
*E01D 1/00* (2006.01)

(52) U.S. Cl. ............... 296/61; 14/69.5; 414/537
(58) Field of Classification Search ............ 296/61, 296/57.1; 14/69.5, 71.1; 414/537, 480, 414/921
See application file for complete search history.

(56) References Cited

U.S. PATENT DOCUMENTS 4,779,298 A * 10/1988 Nichols et al. ............ 14/69.5
6,042,923 A    3/2000 Lewis
6,536,064 B1   3/2003 Swink et al.
6,811,067 B2 * 11/2004 Muizelaar et al. .......... 224/404

FOREIGN PATENT DOCUMENTS

DE    202004004327 U1    7/2004

OTHER PUBLICATIONS

"EZ-IN Ramps of the Carolinas," six-page product description (including "EZN Ramps") of EZ-IN Ramps of the Carolinas, Jacksonville NC 28546, publication website: www.ezramps.com, date unspecified.

* cited by examiner

*Primary Examiner*—Joseph D. Pape (57) ABSTRACT

A pair of folding ramps each of which having a hinge connecting a first ramp section pivotally to a second ramp section. When in a fully unfolded state, structural support adjacent the hinge is provided by a tension cable assembly composed of a tension cable connecting to the first and second ramp sections and passing over an end of a mast, wherein the mast is connected with the hinge so as to be pivotal with respect to the first and second ramp sections. When in a fully folded state, the folding ramps are stored within a ramp storage receptacle of a tail gate.

12 Claims, 6 Drawing Sheets

FOLDING RAMP SYSTEM

TECHNICAL FIELD

The present invention relates to ramps used to move articles between lower and higher elevations, and more particularly ramps used to load and unload an automotive cargo bed. Still more particularly, the present invention relates to a folding ramp system featuring folding ramps which are operatively strengthened adjacent the hinge thereof by a tension cable assembly.

BACKGROUND OF THE INVENTION

The loading and unloading of the cargo bed of an automotive vehicle, such as for example a pick-up truck or sport utility, involves changing the elevation of articles between the ground and the cargo bed, wherein the cargo bed is ordinarily a few feet higher than the ground. This frequently involves lifting and lowering motions by one or more persons to effect the loading/unloading of the one or more articles with respect to the cargo bed.

In many cases, the articles being conveyed to and from the cargo bed are wheeled, and the conveyance thereof can be eased by utilization of one or more ramps. In this regard, a narrow ramp may provide cargo bed conveyance of a single or in-line wheeled article, as for example a wheel barrow, bicycle or motor cycle. And in this regard further, a wide ramp or a pair of mutually spaced narrow ramps may provide cargo bed conveyance of left-right wheeled articles, as for example a golf cart, an all terrain vehicle, or garden tractor, as well as specialty vehicles, as for example a snow mobile.

While ramps of the aforesaid types are known in the art, and may be in the form of commercially manufactured ramps, or simply in the form of home-made planks or plywood, the problem associated therewith is the vehicular storage thereof when not in use. This storage problem is significant in terms of where in the vehicle the ramps can be stored and yet leave cargo space not adversely affected thereby. Certainly, ramps left at home do not help when articles need to be conveyed with respect to the cargo bed and the vehicle is not at home, but is rather somewhere away on the road.

Accordingly, what remains needed in the art is a ramp system which can somehow be stored easily in the vehicle without taking up valuable cargo space.

SUMMARY OF THE INVENTION

The present invention is a folding ramp system featuring a pair of folding ramps which, when in a fully unfolded state for use, are structurally supported adjacent the hinge thereof by a tension cable assembly. Because the ramps are folding, the length thereof is substantially halved when in a fully folded state, allowing the ramps to be stored easily in the vehicle without adversely affecting the vital cargo space thereof, indeed the storage may be advantageously provided by a receptacle within the tail gate (end gate) of the vehicle.

The folding ramp system according to the present invention includes a pair of folding ramps. Each folding ramp has a first ramp section, a second ramp section and a hinge pivotally, and generally centrally, connecting together the first and second ramp sections. To maximize rigidity, yet minimize weight, each of the first and second ramp sections has left and right longitudinal beams at an underside thereof, wherein the longitudinal beams are placed so that when the folding ramp is in a fully folded state, the longitudinal beams mutually nest.

In order to provide structural strength adjacent the hinge when the folding ramps are in the fully unfolded state and placed into service to convey articles between the cargo bed and the ground, a tension cable assembly is provided at the underside of the folding ramps. The tension cable assembly is composed of a mast pivotally connected to the hinge, and a tension cable extending from a distal end of the first ramp section to a distal end of the second ramp section. When a folding ramp is in its fully unfolded state and placed into service as a conveyance ramp, the tension cable becomes taut. Should weight be applied to the mid-span of the folding ramp, the tension cable undergoes a commensurate tensioning which effects to supply a supportive force to the mast so that any tendency of the folding ramp to bend under the weight at the mid-span thereof is supportably resisted.

Advantageously, it is preferred for a receptacle to be provided in the tail gate (end gate) of the motor vehicle into which the pair of folding ramps is conveniently stored. A selectively openable access panel of the tail gate allows restricted access to the folding ramps, as needed.

Accordingly, it is an object of the present invention to provide a folding ramp system for a motor vehicle, wherein the folding ramps thereof are tension-cable supported when in a fully unfolded state, and wherein the folding ramps are storable in a receptacle of a tailgate when in a fully folded state.

This and additional objects, features and advantages of the present invention will become clearer from the following specification of a preferred embodiment.

DESCRIPTION OF THE PREFERRED EMBODIMENT

Figures 1, 2:
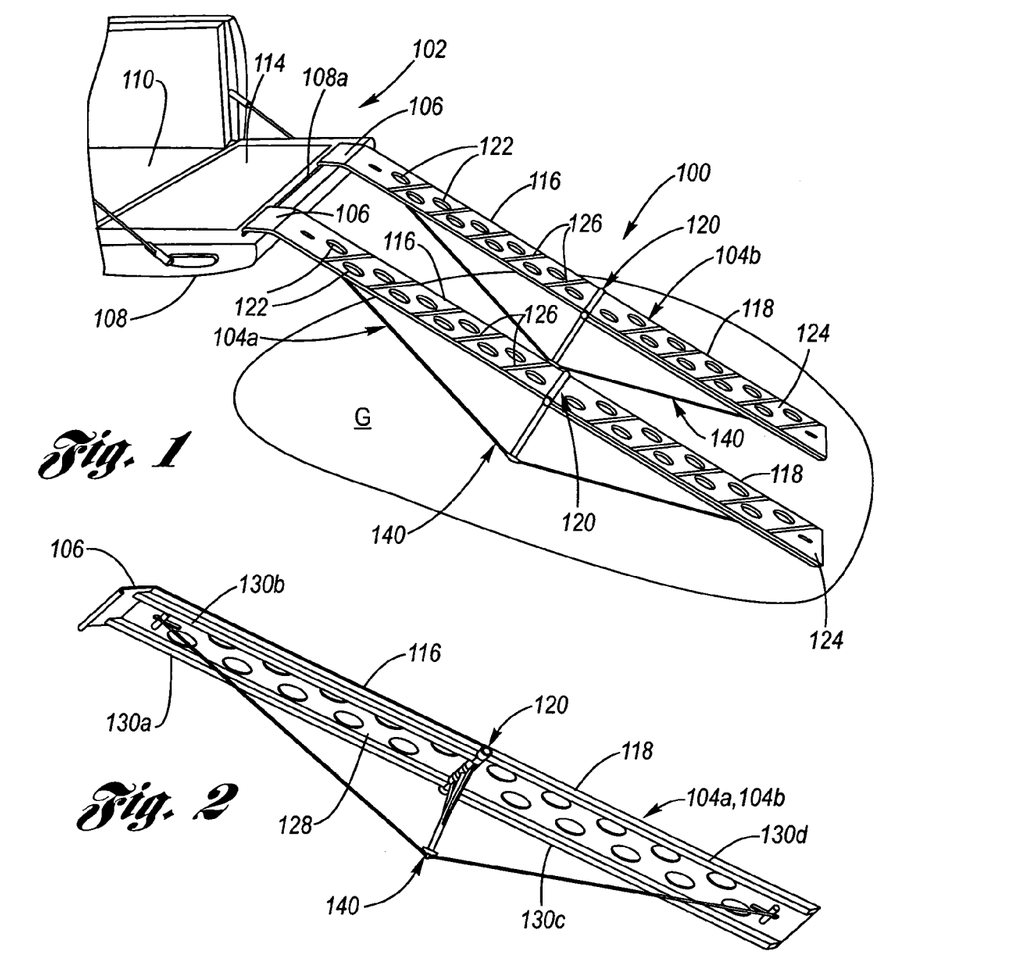
FIG. 1 is a perspective view of the folding ramp system according to the present invention, shown in its fully unfolded state and shown in operation with respect to a tail gate and cargo bed of a motor vehicle.
FIG. 2 is a perspective view of a folding ramp according to the present invention, wherein the folding ramp is shown in its fully unfolded state.
Figure 3:
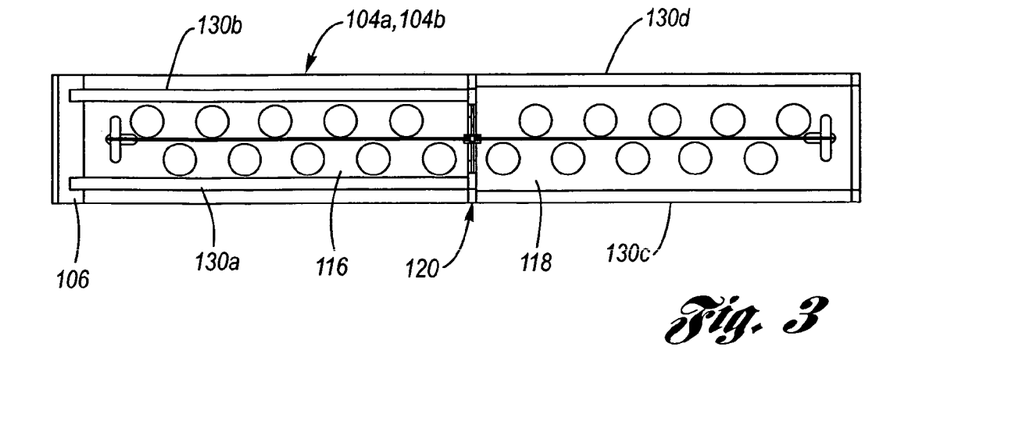
FIG. 3 is an underside plan view of a folding ramp according to the present invention, wherein the folding ramp is shown in its fully unfolded state.

Referring now to the Drawing, FIG. 1 is an example of a folding ramp system 100 according to the present invention, shown with respect to a motor vehicle 102. A pair of folding ramps 104a, 104b are provided wherein, when operatively deployed as shown, a head 106 thereof lies generally flatly upon the tail gate 108 of the motor vehicle in parallel relation thereto, whereby the folding ramps span acutely the elevational difference between the cargo bed 110 and the ground G.

In the most preferred form of the present invention, the tail gate 108 is provided with a ramp storage receptacle 112 (see FIG. 11A), having a selectively openable access panel 114. In a fully folded state of the folding ramps 104a, 104b (see FIG. 5), the folding ramps are neatly and conveniently stored in the ramp storage receptacle 112 without intruding whatsoever into the cargo bed 110 (see FIG. 11C).

Each folding ramp 104a, 104b is composed of a first ramp section 116, a second ramp section 118 and a hinge 120 which provides a pivoting connection between the first and second ramp sections. It is preferred for the first and second ramp sections 116, 118 to be substantially of equal length and be constructed of a light weight, strong and durable sheet, preferably aluminum. The first and second ramp sections 116, 118 are preferably provided with cut-outs 122 to minimize sheet weight and to locate the folding ramps with respect to posts 112p of the ramp storage receptacle 112 (see FIG. 11C), as will be discussed in greater detail hereinbelow. Additionally, it is preferred for the upperside 124 of the first and second ramp sections 116, 118 to be provided with anti-slip surfacing 126.

The underside 128 of the first ramp section 116 is reinforced by a pair of mutually spaced apart first longitudinal beams 130a, 130b, and the second ramp section 118 is reinforced by a pair of mutually spaced apart second longitudinal beams 130c, 130d. The first and second longitudinal beams are connected to their respective first and second ramp sections 116, 118, as for example by periodically spaced welds, wherein the preferred composition thereof is extruded aluminum. The first longitudinal beams 130a, 130b of the first ramp section 116 are mutually closer together than the second longitudinal beams 130c, 130d of the second ramp section 118 (this spacing can be vice versa), so that when the folding ramps 104a, 104b are in the fully folded state, the first and second longitudinal beams mutually nest (see FIGS. 5 and 6) with a minimum distance between the first an second ramp sections 116, 118, defined by a thickness of the first and second longitudinal beams (see FIG. 6).

Figure 8:
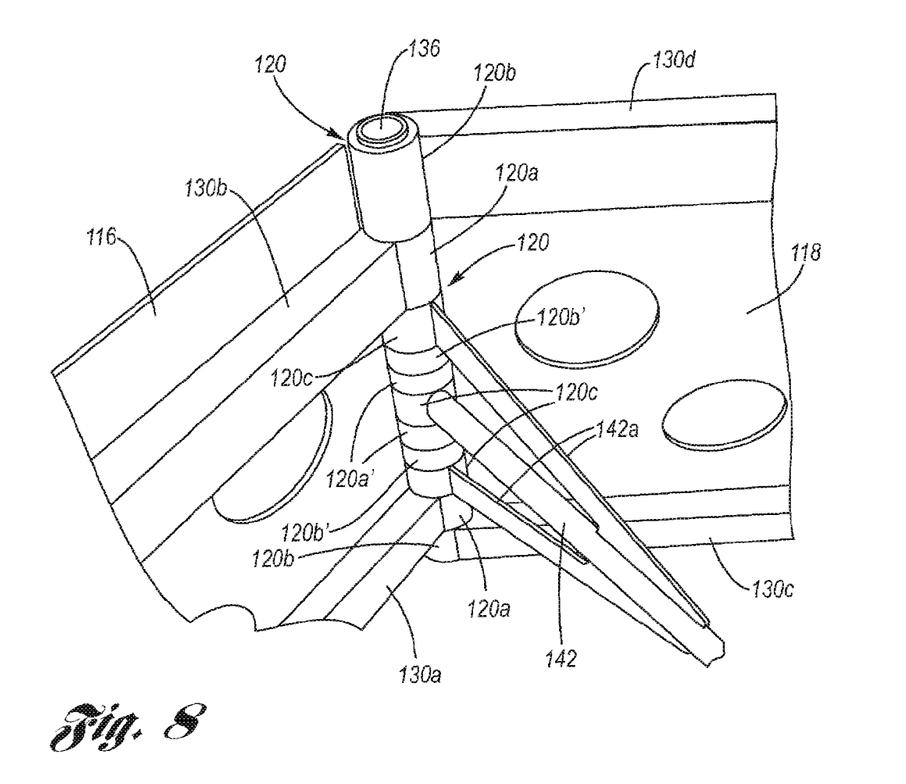
FIG. 8 is a perspective, broken-away view of a folding ramp according to the present invention, showing in particular the hinge thereof.

As shown best at FIG. 8, the proximal end of the first longitudinal beams 130a, 130b are connected to first primary hinge barrels 120a of the hinge 120, while the first ramp section 116 is also connected to second primary hinge barrels 120a' of the hinge. The proximal end of the second longitudinal beams 130c, 130d are connected to first secondary hinge barrels 120b of the hinge 120, while the second ramp section 118 is also connected to second secondary hinge barrels 120b' of the hinge. Accordingly, the primary hinge barrels 120a, 120a' are able to pivot on the pivot pin 136 with respect to the secondary hinge barrels 120b, 120b'. The distal end of each of the first longitudinal beams 130a, 130b preferably ends at the head 106, and the distal end of each of the second longitudinal beams ends at a bevel for parallel ground interfacing as depicted at FIG. 1.

In order to provide structural strength of the folding ramps 104a, 104b in the mid-span adjacent the hinge 120 thereof, a tension cable assembly 140 is provided at the underside 128. When the folding ramps 104a, 104b are in the fully unfolded state and placed into service (as shown by way of example at FIG. 1), the tension cable assembly 140 provides support to the mid-span (the region generally adjacent either side of the hinge 120).

The tension cable assembly 140 includes a mast 142 having a pair of side supports 142a. The base of the mast 142 and the side supports 142a are each connected to tertiary hinge barrels 120c so as to be pivotal with respect to the hinge pin 136 independently of the pivoting of the first and second ramp sections 116, 118 at the primary and secondary hinge barrels The tension cable assembly 140 further includes a tension cable 144 extending from a first anchor 146a located adjacent a distal end 116a of the first ramp section 116 to a second anchor 146b located adjacent a distal end 118a of the second section 118 (see FIG. 4). The tension cable 144 connects pivotally to the first and second anchors. Preferably, the tension cable 144 is in the form of a braided aluminum cable which is looped at each end for loopingly receiving, respectively, the first and second anchors.

Figure 4:
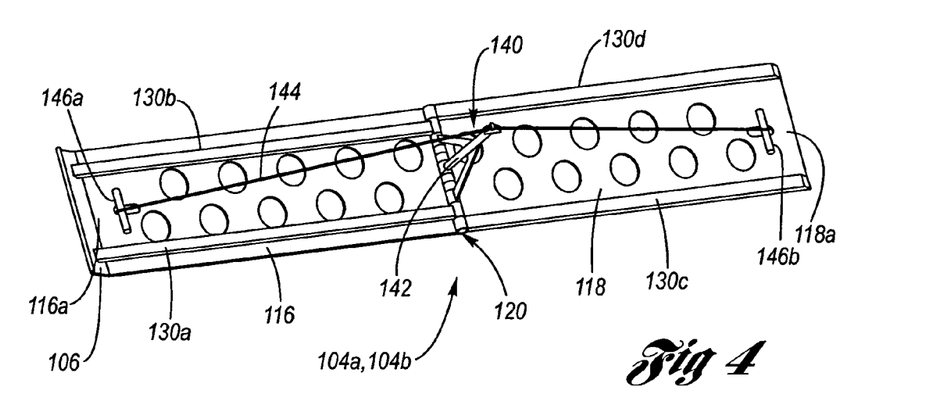
FIG. 4 is a second perspective view of a folding ramp according to the present invention, wherein the folding ramp is shown in its fully unfolded state.
Figure 5:
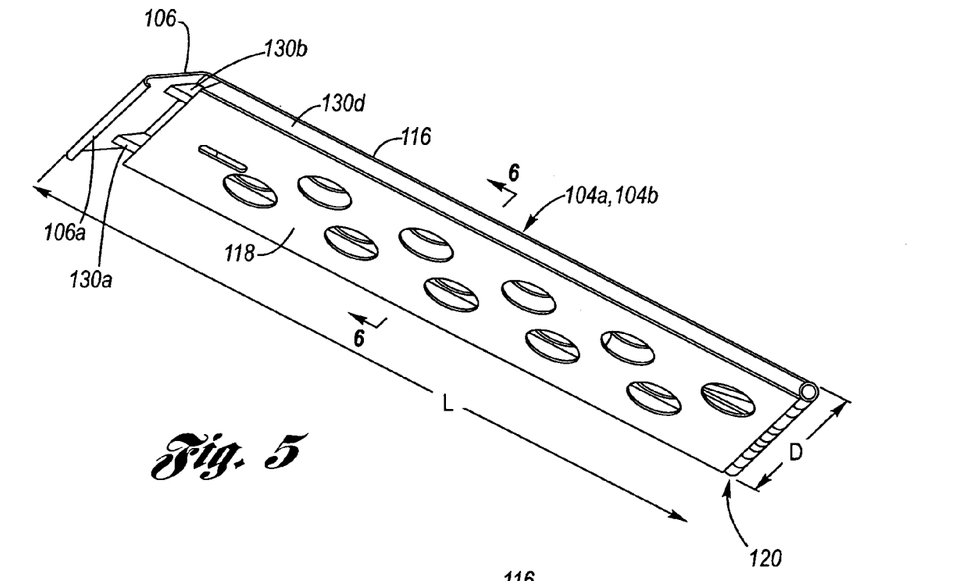
FIG. 5 is a perspective view of a folding ramp according to the present invention, wherein the folding ramp is shown in its fully folded state.
Figure 6:
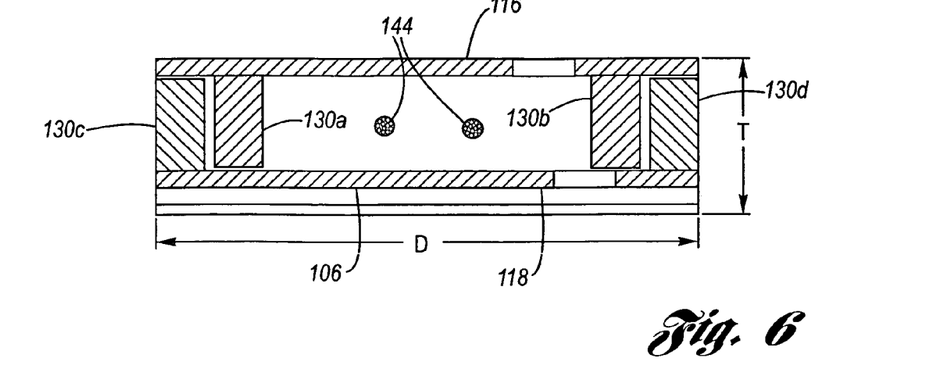
FIG. 6 is a sectional view seen along line 6-6 of FIG. 5.
Figure 7:
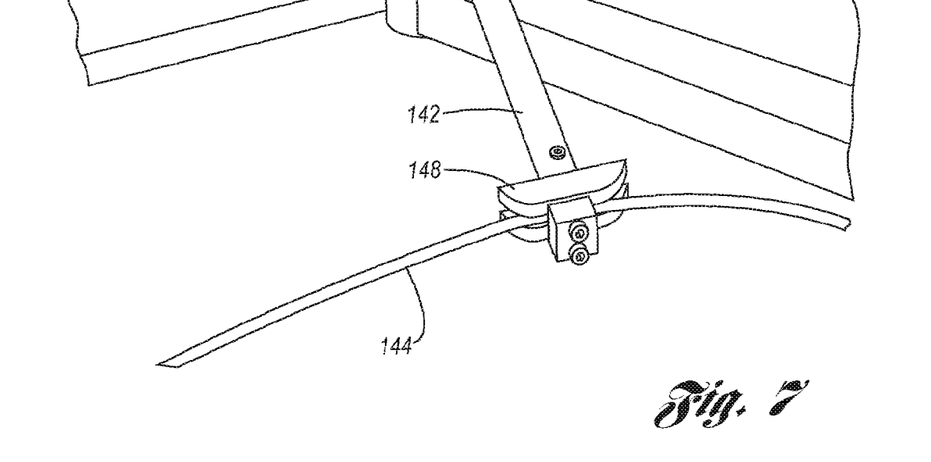
FIG. 7 is a perspective, broken-away view of a folding ramp according to the present invention, showing in particular a cable guide of the mast thereof, wherein the cable guide is shown in its deployed orientation.
Figure 9:
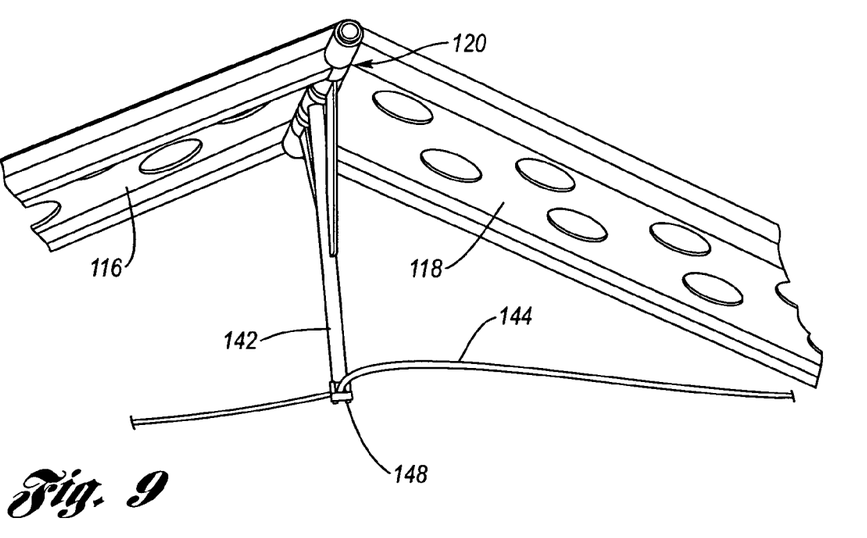
FIG. 9 is a perspective, broken-away view of a folding ramp according to the present invention, showing in particular the cable guide of the mast thereof, wherein the cable guide is shown in its storage orientation.

As shown best at FIG. 7, a cable guide 148 is rotatably connected to the upper end of the mast 142 and serves to locate the tension cable 144 with respect to the upper end of the mast. The rotatability of the cable guide 148 allows for a free rotation between the deployed orientation, as shown at FIGS. 4 and 7, and a storage orientation (rotated about ninety degrees clock-wise or counter clock-wise from the deployed orientation), as shown at FIG. 9, utilized when the folding ramps 104a, 104b are moved into the fully folded state, as shown at FIG. 5, so that the cable guide 148 and the tension cable 144 exiting from opposites sides thereof has room to fit easily between the first and second ramp sections 116, 118 in the space between the longitudinal beams.

In operation of the folding ramp system 100, the folding ramps 104a, 104b are moved to the fully unfolded state, whereupon the tension cable 144 is taut. Now the folding ramps are positioned into service as generally depicted at FIG. 1, wherein the folding ramps have an acute angle to the ground and the head 106 is obtusely angled relative to the first ramp section 116 such that it lies generally flat upon the tail gate 108. In order to ensure the folding ramps cannot slide off the tail gate, a lip 106a on the head lips onto a boss 108a of the tail gate 108. The boss 108a may be raised or depressed in relation to the adjacent surface of the tail gate 108.

Figure 10:
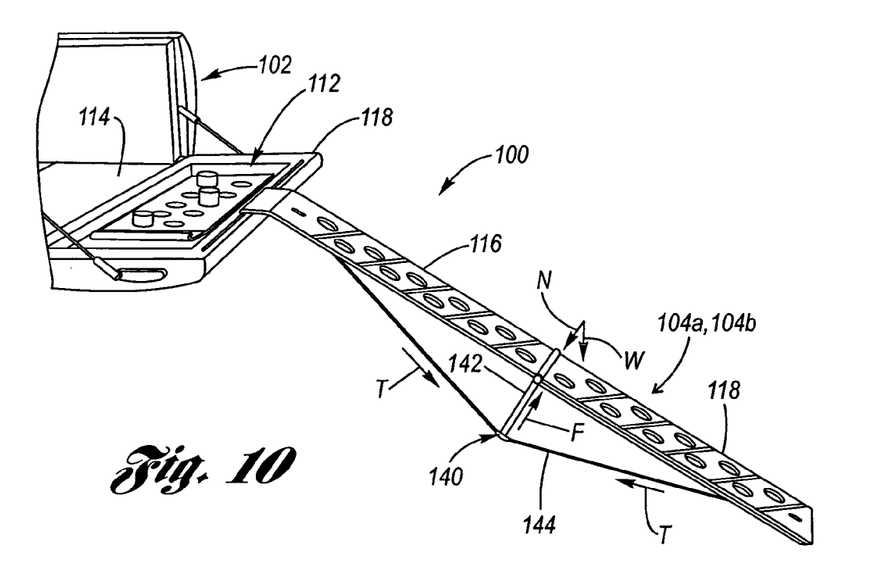
FIG. 10 is a perspective view of a folding ramp according to the present invention shown in operation with respect to a motor vehicle, wherein exemplar forces operating thereupon are indicated.

As shown at FIG. 10, when a weight W applies a normal force N to the mid-span of a folding ramp 104a, 104b, the normal force tends to cause the folding ramp to bend at the mid-span, particularly at the hinge 120. However, the tension cable undergoes a tensioning T which translates into an opposite force F at the mast which counterbalances the normal force of the weight. A non-limiting example for the length of the mast may be about one-third the length of the first and second ramp sections, wherein consideration is given to the principle that, for a given weight (normal force) acting on the folding ramp, the longer the mast, the lower would be the tension in the tension cable. In this regard, the length of the mast 142 in relation to the distance between the hinge 120 and the first and second anchors 146a, 146b is pre-selected so that the tension cable 144 is able to supply the opposite force F in response to its tensioning T under a predetermined amount of weight W (normal force N) at the mid-span, without causing the tension in the tension cable to exceed its operational limit.

When it is time to store the folding ramps 104a, 104b, the user grasps a folding ramp, and preferably, in so doing also grasps the tension cable and pulls thereon as the first and second ramp sections 116, 118 fold on each other. The cable guide 148 will rotate to the storage orientation as needed in response to the tension cables abutting the underside of the first and second ramp sections. When both folding ramps 104a, 104b have been placed into the fully folded state, they may then be stored in the tail gate 108, as will next be detailed.

Referring now to FIGS. 11A through 11D, operation of the folding ramp system 100 will be detailed with respect to storage and deployment of the folding ramps 104a, 104b vis-a-vis the ramp storage receptacle 112.

A key feature of the folding ramp system 100 is that the folding ramps 104a, 104b are foldable near or at the midpoint thereof via the hinge 120 which thereby permits the folding ramps to be stored within the width, height and length of a typical tail gate (end gate) of a motor vehicle. Therefore, the dimensions of the folding ramps 10a, 104b are pre-selected with respect to the ramp storage receptacle 112 of the tail gate 108 so that the width D, folded length L and thickness T (see FIGS. 5 and 6) of the folding ramps 104a, 104b are less than the overall length L', width D' and depth T' of the ramp storage receptacle formed within the tail gate such that both of the folding ramps fit completely into the ramp storage receptacle, that is, entirely within the tail gate.

The access panel 114 of the ramp storage receptacle 112 is hinged 148 with respect to the bottom of the tail gate, and has a typical operative sequence of being: unlocked, pivoted open to access the folding ramps, pivoted back onto the tail gate to serve as a platform over the ramp storage receptacle during loading and unloading of articles (see FIG. 1), pivoted open to allow the folding ramps to be re-stored, then pivoted back onto the tail gate and thereupon locked.

Figure 11A:
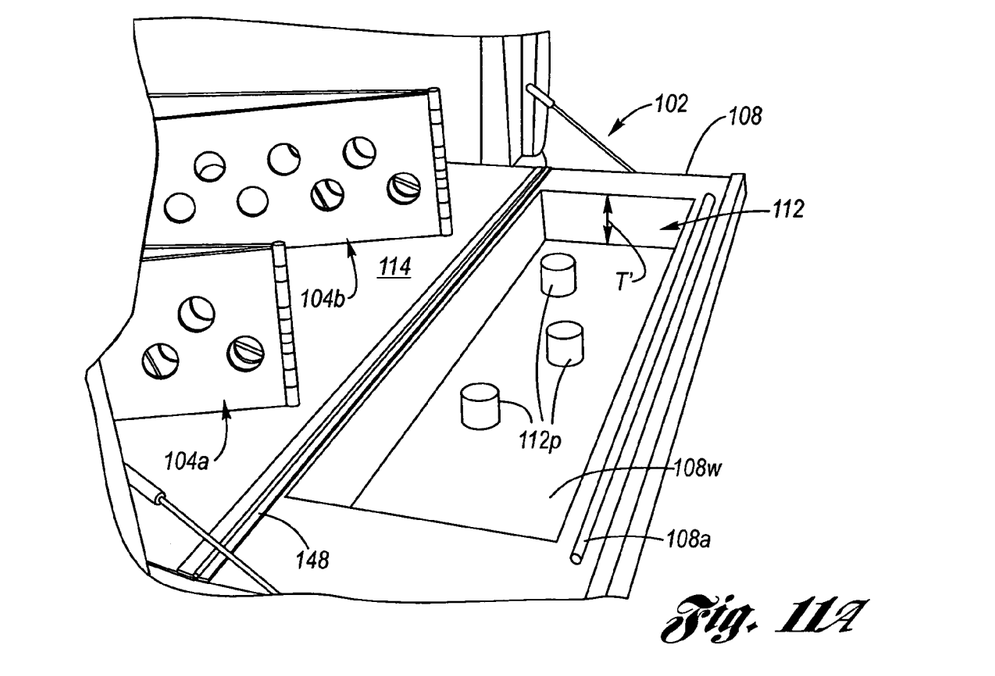
FIGS. 11A through 11D are a succession of perspective views of the folding ramp system according to the present invention, showing a portion of a motor vehicle cargo bed, wherein a pair of folding ramps according to the present invention are shown being stored into a ramp storage receptacle located in the tailgate of the motor vehicle.

At FIG. 11A, the folding ramps 104a, 104b are seen lying in the cargo bed upon the access panel 114, which, itself, is lying upon the floor of the cargo bed 110. A plurality of location posts 112p are connected to the front wall 108w of the tail gate 108 and project upwardly with respect to the ramp storage receptacle. The height of the location posts is selected so that when the access panel is pivoted so as to close the ramp storage receptacle, the location posts abut the access panel, and thereby render structural support thereto.

Figure 11B:
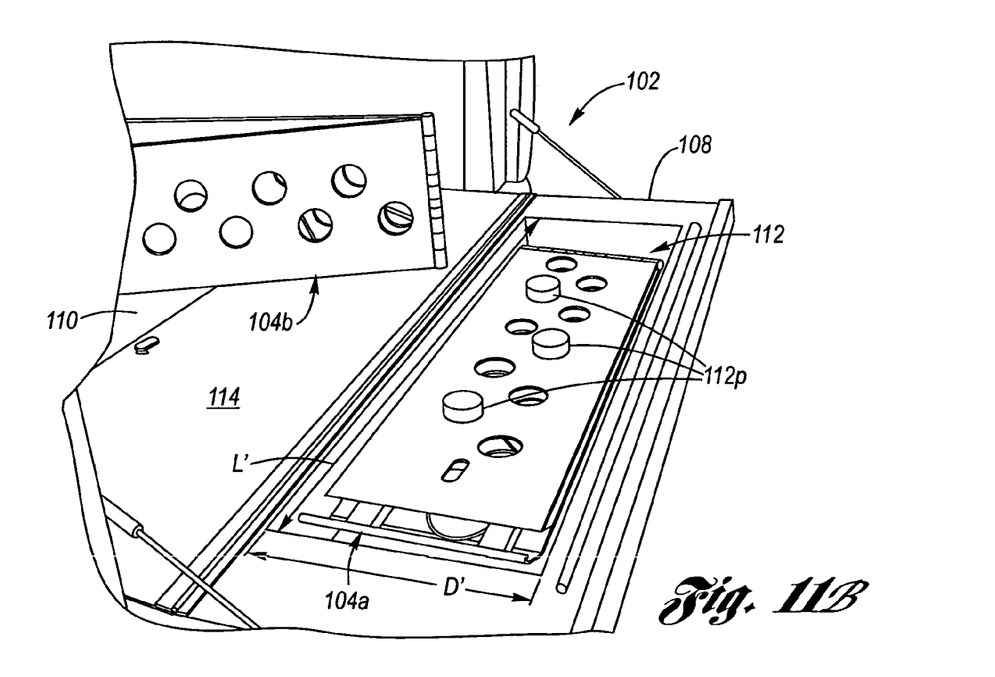

At FIG. 11B, one of the folding ramps is placed into its fully folded state and then placed into the ramp storage receptacle. In this regard the cut-outs 122 cooperate with the location posts 112p so that the location posts pass therethrough and at the same time assist location of the folding ramp with respect to the ramp storage receptacle.

Figure 11C:
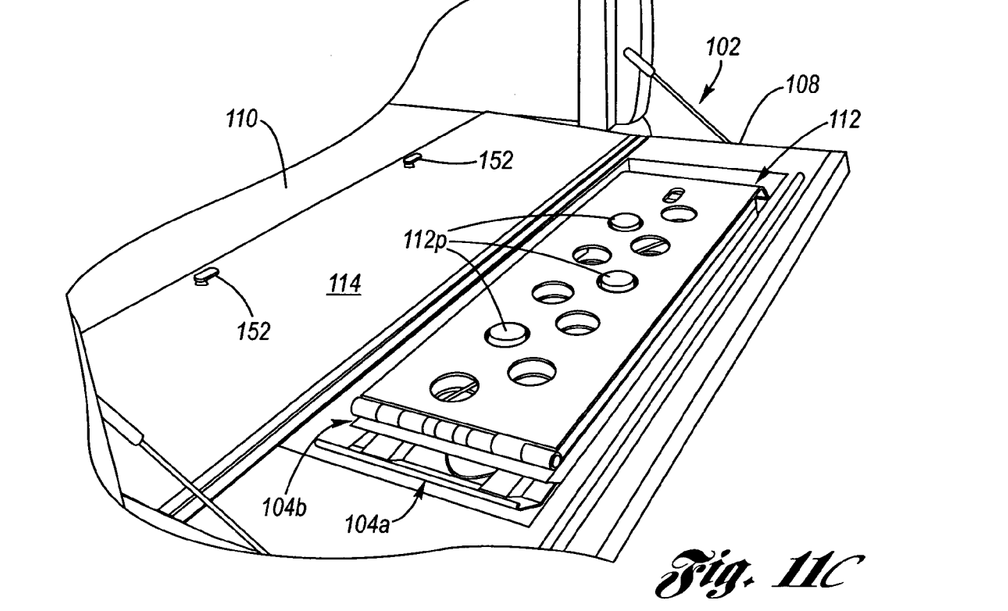

At FIG. 11C, the other folding ramp is now placed into its fully folded state and then placed into the ramp storage receptacle upon the previously placed folding ramp. Again, the cut-outs thereof cooperate with the location posts so that the location posts pass therethrough and at the same time assist location of the folding ramp with respect to the ramp storage receptacle.

Figure 11D:
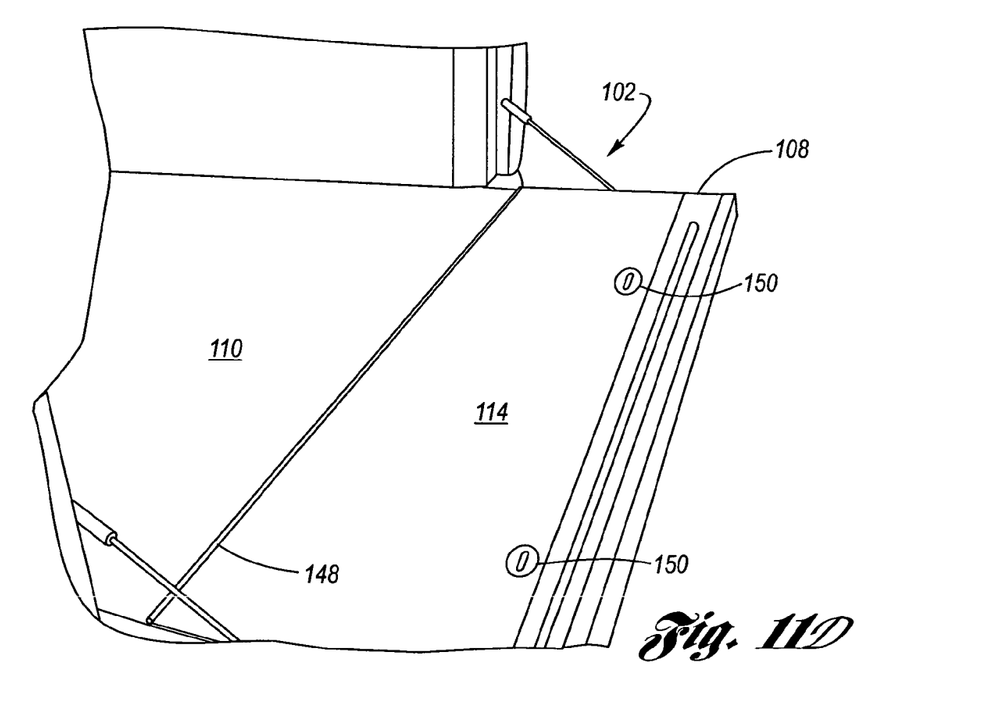

At FIG. 11D, the access panel is now pivoted up to its closed position, and then secured in that position with respect to the tailgate. By way of preferred example, a pair of key operated locks 150 on the access panel secure the access panel by selective rotation of lock legs 152 (see FIG. 11C) into interfering abutment with respect to the tailgate at the ramp storage receptacle.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A folding ramp, comprising:
   a first ramp section having an underside;
   a second ramp section having an underside;
   a pair of first longitudinal beams connected to said underside of said first ramp section;
   a pair of second longitudinal beams connected to said underside of said second ramp section;
   a hinge pivotally connecting said first ramp section to said second ramp section; and
   a tension cable assembly located at said underside of said first and second ramp sections, said tension cable assembly comprising:
      a tension cable having a first end connected said first ramp section adjacent a distal end thereof, and a second end connected to said second ramp section adjacent a distal end thereof; and
      a mast having a base connected to said hinge in pivotal relation to both of said first and second sections, said mast having an end opposite said base at which said tension cable is generally located;
   wherein said first and second ramp sections are foldable between a fully folded state of the folding ramp and a fully unfolded state of the folding ramp;
   wherein when said first and second ramp sections are in said fully unfolded state of the folding ramp, said tension cable is substantially taut;
   wherein said pairs of first and second longitudinal beams are located such that at said fully folded state of the folding ramp, said pairs of first and second longitudinal beams nest with respect to each other; and
   wherein said hinge comprises a hinge pin, a pair of primary hinge barrels pivotal on said hinge pin, and a pair of secondary hinge barrels pivotal on said hinge pin independently of said pair of primary hinge barrels; wherein:
   each of said first longitudinal beams is connected to a respective one of said primary hinge barrels of said hinge; and
   each of said second longitudinal beams is connected to a respective one of said secondary hinge barrels of said hinge.

2. The folding ramp of claim 1, wherein said hinge further comprises at least one tertiary hinge barrel pivotal on said hinge pin independently of said primary and secondary hinge barrels; wherein said base of said mast is connected to said at least one tertiary hinge barrel.

3. The folding ramp of claim 2, further comprising a cable guide rotatably mounted to said end of said mast, said tension cable being engaged by said cable guide such that said tension cable is located at said end of said mast.

4. The folding ramp of claim 3, further comprising a head connected to said first ramp section at an obtuse angle relative thereto.

5. The folding ramp of claim 1, further comprising a cable guide rotatably mounted to said end of said mast, said tension cable being engaged by said cable guide such that said tension cable is located at said end of said mast.

6. A folding ramp system, comprising:
a motor vehicle tail gate, said tail gate having a ramp storage receptacle formed therein; and
a pair of folding ramps, each folding ramp of said pair of folding ramps comprising:
  a first ramp section having an underside;
  a second ramp section having an underside;
  a pair of first longitudinal beams connected to said underside of said first ramp section;
  a pair of second longitudinal beams connected to said underside of said second ramp section;
  a hinge pivotally connecting said first ramp section to said second ramp section; and
  a tension cable assembly located at said underside of said first and second ramp sections, said tension cable assembly comprising:
    a tension cable having a first end connected said first ramp section adjacent a distal end thereof, and a second end connected to said second ramp section adjacent a distal end thereof; and
    a mast having a base connected to said hinge in pivotal relation to both of said first and second sections, said mast having an end opposite said base at which said tension cable is generally located;
  wherein said first and second ramp sections are foldable between a fully folded state of the folding ramp and a fully unfolded state of the folding ramp; and wherein when said first and second ramp sections are in said fully unfolded state of the folding ramp, said tension cable is substantially taut;
wherein said ramp storage receptacle is dimensioned to receive thereinto said first and second folding ramps when said first and second folding ramps are in said fully folded state;
wherein said pairs of first and second longitudinal beams are located such that at said fully folded state, said pairs of first and second longitudinal beams nest with respect to each other; and
wherein said hinge comprises a hinge pin, a pair of primary hinge barrels pivotal on said hinge pin, and a pair of secondary hinge barrels pivotal on said hinge pin independently of said pair of primary hinge barrels; wherein:
  each of said first longitudinal beams is connected to a respective one of said primary hinge barrels of said hinge; and
  each of said second longitudinal beams is connected to a respective one of said secondary hinge barrels of said hinge.

7. The folding ramp system of claim 6, wherein said hinge further comprises at least one tertiary hinge barrel pivotal on said hinge pin independently of said primary and secondary hinge barrels; wherein said base of said mast is connected to said at least one tertiary hinge barrel.

8. The folding ramp system of claim 7, further comprising a cable guide rotatably mounted to said end of said mast, said tension cable being engaged by said cable guide such that said tension cable is located at said end of said mast.

9. The folding ramp system of claim 8, further comprising a head connected to said first ramp section at an obtuse angle relative thereto.

10. The folding ramp system of claim 9, further comprising an access panel pivotally connected to said tail gate, wherein said access panel selectively covers said ramp storage receptacle.

11. The folding ramp system of claim 10, further comprising a plurality of posts connected with said tail gate and located within said ramp storage receptacle; wherein said first and second foldable ramps have openings through which said plurality of posts pass when said first and second folding ramps are located within said ramp storage receptacle, and wherein said access panel abuts said plurality of posts when said access panel covers said ramp storage receptacle.

12. The folding ramp system of claim 11, further comprising:
  a lip on said head; and
  a boss on said tailgate which engages said lip.

* * * * *